Nov. 22, 1960   A. P. DOUGLAS ET AL   2,961,152
PORTABLE FAN UNIT AND WINDOW ADAPTER
Filed Dec. 9, 1955   3 Sheets-Sheet 3
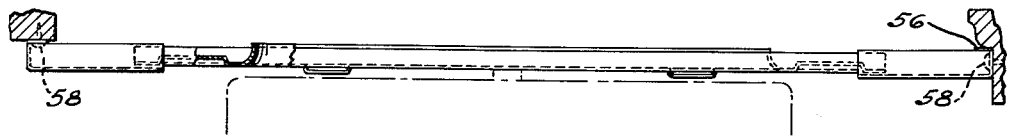
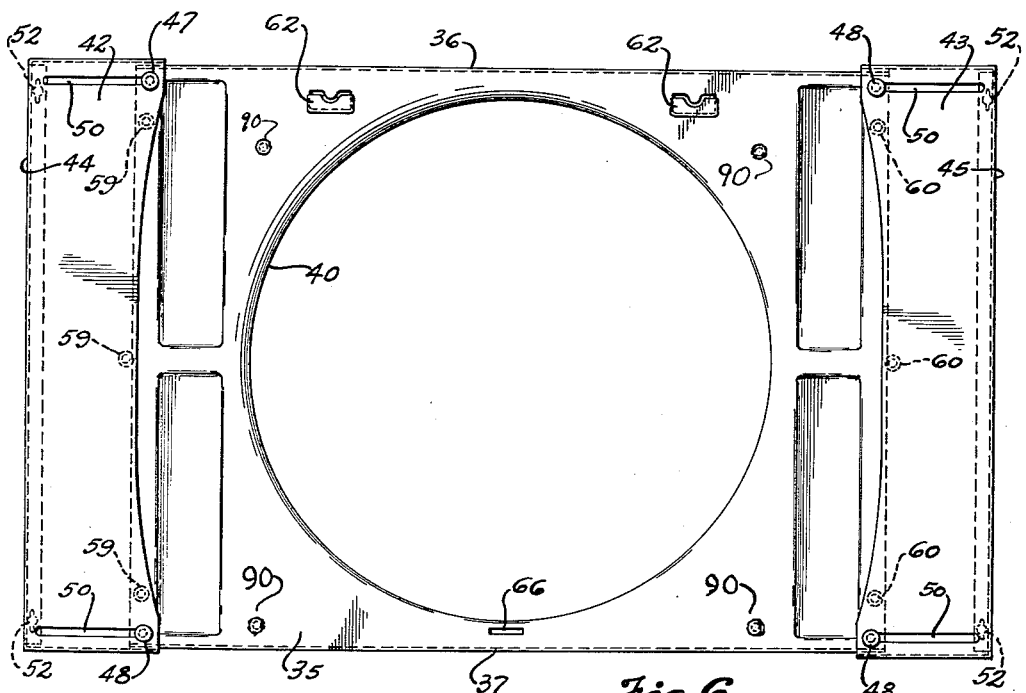
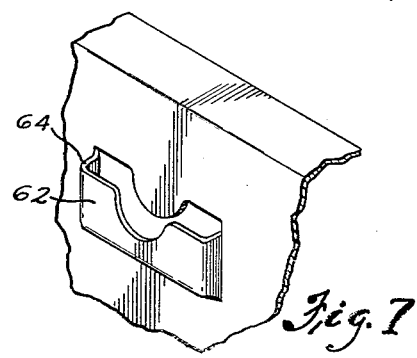
INVENTORS,
ALVIN P. DOUGLAS
GILBERT B. HAHN
BY
Gohrick & Gohrick
ATTORNEYS

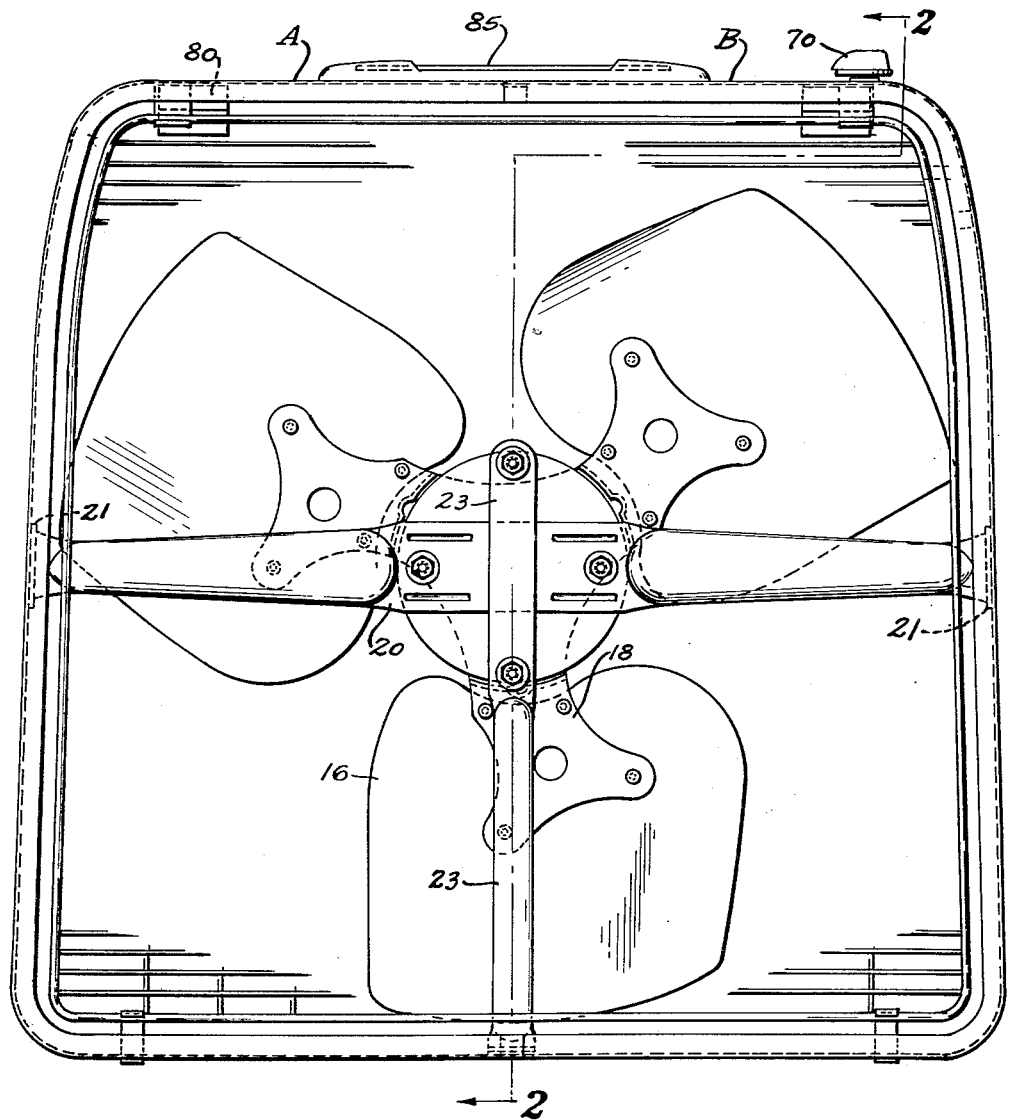

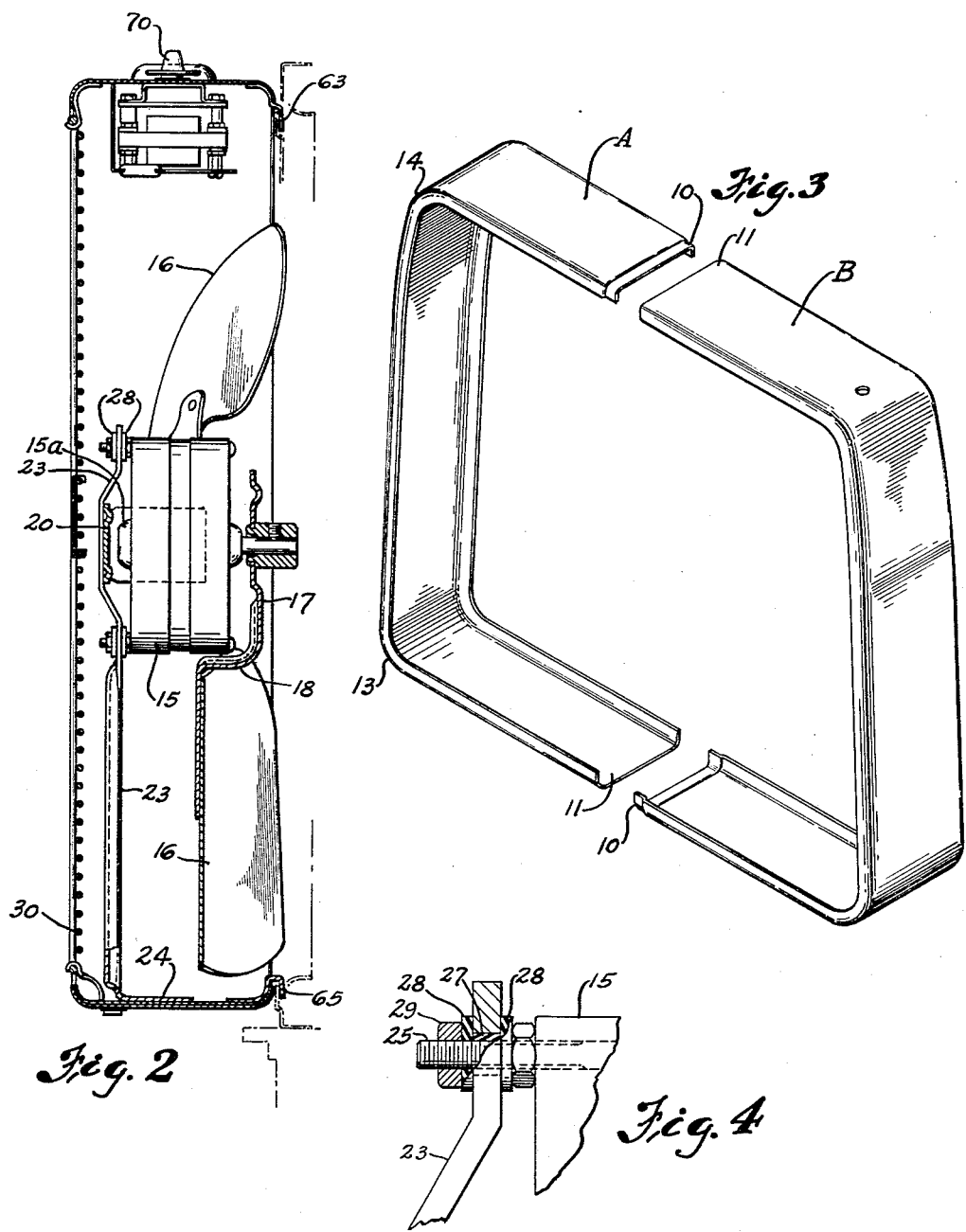

United States Patent Office 2,961,152
Patented Nov. 22, 1960

2,961,152

PORTABLE FAN UNIT AND WINDOW ADAPTER

Alvin P. Douglas, Cleveland Heights, and Gilbert B. Hahn, Lyndhurst, Ohio, assignors to The Murray Ohio Manufacturing Company, Cleveland, Ohio, a corporation of Ohio Filed Dec. 9, 1955, Ser. No. 552,044

1 Claim. (Cl. 230—259)

This invention is directed to improvements in heavy duty portable motor-fan units and has for its general object the provision of a fan housing unit which while being noiseless may be manufactured in an economical manner.

A more specific object of the invention is the provision of a combined heavy duty fan unit and window mounting which will be compact when mounted in a window, noiseless in operation while being convenient in window attachment, removal and storage.

Other objects of the invention will be apparent from the following description referring to the accompanying drawing showing a preferred embodiment thereof. The essential characteristics are summarized in the claim.

In the drawings:

Fig. 1 shows a vertical elevation of our motor-fan unit as viewed from the front or air intake side of the unit;

Fig. 2 is a vertical cross section taken substantially along the line 2—2 of Fig. 1;

Fig. 3 is a perspective view of a pair of U-shaped drawn sheet metal members which constitute the main frame and housing structure of the portable motor-fan unit;

Fig. 4 is an enlarged fragmentary detail of the manner of mounting the motor unit in the housing;

Fig. 5 is a top view of a window mounting means adaptable for adjustment to the varying widths of windows;

Fig. 6 is an elevational view of the adapter shown in Fig. 5; and

Fig. 7 is an enlarged fragmentary view of one of two socket structures formed in the face of the adapter structure for receiving flat hooks on the motor-fan unit.

Our invention contemplates the provision of a motor-fan unit of relatively light weight for the work to be performed whereby the unit may be carried conveniently from place to place while being of heavy duty capacity such as an air displacement of 200 to 250 cubic feet per minute. The unit is combined with a window adapter of minimum width constructed to be free of noise producing vibrations. The fan housing comprising the portable frame of the motor-fan unit is formed of two U-shaped members channel shaped in cross section with the yokes of the U-shaped pieces forming slanted side walls of the housing structure when the leg ends of the U-shaped members are welded together at the central vertical plane of the housing structure. In Fig. 3 we show two such U-shaped members A and B which are complements of each other. The members have one leg end inset to telescope with the end 11 of the opposite leg of the other member. The substantially rectangular housing thus produced is rigid due to the channel shape cross section. It will be noted that the corners 13—14 of the frame are liberally rounded and the metal can be well set by forming the U-shaped members in a draw press whereby uniformity in production is assured.

The motor-fan unit comprises a heavy duty motor 15 and a fan structure 16 comprising three blades mounted on a hub 17 and an inwardly offset spider structure 18 (see Fig. 2).

The motor 15 is supported on a cross beam member 20 having integral pads 21 formed thereon extending at substantially a right angle to the beam to afford securement by riveting or welding of the beam member 20 to the sloping side walls of the housing frame. A vertical column 23 has a foot 24 thereof secured to the bottom wall of the housing structure. As shown in Figs. 1 and 2 the column member 23 extends upwardly above the beam member 20 and both the beam member and column have the contacting regions thereof offset toward the front end of the housing structure to clear the front motor bearing structure 15a.

The mounting of the motor is effected by extensions 25 of the four motor frame bolts which pass through properly spaced openings formed in the beam member 20 and the column member 23. As shown in Fig. 4 vibration insulator sleeves 27 and washers 28 preferably formed of neoprene serve to prevent vibration transmission from the motor-fan unit to the motor supporting members 20—23 and to the housing structure when the motor-fan unit is secured therein by nuts 29.

It will be noted from Fig. 2 that the entire unit is relatively narrow and the front opening of the housing is provided with a removable screen structure 30 to protect the bearer of the unit should the fan be running.

The adapter structure comprises a main central panel 35 flanged at the top 36 and bottom 37 and is provided with a central air passage opening having a semi-venturi perimeter 40. Two end panels 42 and 43 are flanged at the outer ends 44 and 45 and at the tops and bottoms thereof. The end panels 42 and 43 are attached to the respective ends of the main or central panel 35 by wing bolts or screws 47 and 48 and slots 50 to permit of sliding adjustment of the end panel members to fit window frames of various widths.

Bayonet lock type openings 52 are provided in both the face flange 56 and the end flanges 44 and 45 of the panel members 42 and 43, whereby the panel assembly may be attached by screws 58 to the face or side edge surfaces of a window frame. Cushions 59 and 60 in the form of resilient buttons are disposed between the juxtaposed surfaces of the central panel and the adjustable end panels to dampen vibration. Resilient cushions 90 are also provided to be disposed between the rear flange of the fan housing and the venturi panel to dampen vibration and harmonic build up.

To mount the portable unit on the adapter we provide like upwardly open, horizontally spaced slideway sockets 62 struck up on the face of the central panel member near the top margin thereof and symmetrically disposed relative to the semi-venturi opening (see Figs. 6 and 7). The housing of the motor-fan unit is provided with two downwardly extending flat hook or slide formations 63 affixed inside the upper transverse part of the back flange and offset to locations outside of the flange, which engage in the sockets so that the weight of the portable unit is taken by the ledges 64. The bottom region of the motor-fan unit is provided with a flat hook 65 which passes through an opening 66 (see Figs. 2 and 6) formed in the venturi wall of the central panel structure. These hooks 65 and 63 are tapered slightly so that no loose play exists in the connections between the motor-fan unit and the supporting central panel.

As will be noted in Fig. 2, the path of the fan blades 16 will be so disposed at the outer part thereof that the fan will be positioned relative to the venturi formation of the adapter in an efficient manner since the fan blades extend out of the housing a slight distance to be adjacent the perimetrical semi-venturi formation 40 on the adapter.

In the upper corners of the housing and suspended from the top thereof may be a timing mechanism 70 whereby the period of motor operation can be timed in the well known manner. If a capacitor motor is used the other upper corner of the housing may contain the starting means 80 suitably wired to the motor. A strap handle may be secured to the top of the housing in any desired manner.

It has been found that the motor-fan housing herein disclosed can be readily installed without the necessity of handling a bulky, relatively heavy apparatus. The adapter is first adjusted for proper window width and then attached to the window frame. The motor-fan unit including housing is then slipped into place on the adapter. Convenience of seasonable removal and storing becomes a light chore.

While compactness required the omission of the venturi structure in the motor-fan housing it has been found that efficiency of air displacement of the fan can be maintained with the venturi formation located in the adapter structure without increasing the thickness of the adapter structure. In a heavy duty ventilator fan the omission of the venturi can cause a drop of 150 to 250 cubic feet of air displacement per minute.

We claim:

In a motor-fan unit and window adapter, a portable motor and fan unit having a housing structure including a frame channel-shaped in cross section to have forward and rearward flanges integral with the housing margins and extending inwardly, said frame substantially defining the extreme dimensions of the housing structure, said housing structure having openings of equal area at the front and back thereof, the motor of said unit being mounted entirely within the housing and centrally supporting said fan relative to said openings to project partially beyond the rear opening, an adjustable metal panel structure having a semi-venturi shaped opening registering with the projecting perimeter of the fan, horizontally spaced upwardly open socket-like formations being struck out of the face of the metal panel structure at locations symmetrical relative to the semi-venturi opening and near the top edge of the panel as motor-fan unit supporting slideways, flat hook elements extending downwardly from and offset outwardly from the upper transverse part of the frame rear flange providing slide formations on the back face of the housing unit adapted to slip vertically into the slideways on the panel structure whereby the unit is hung on the panel structure with the fan in alignment with said semi-venturi opening, and vibration dampening means disposed between an inwardly extending flange of the housing structure and the panel structure having the semi-venturi opening.

References Cited in the file of this patent
UNITED STATES PATENTS

| | | |
|---|---|---|
| 1,917,327 | Preston | July 11, 1933 |
| 1,935,179 | Orear | Nov. 14, 1933 |
| 2,622,793 | Ganger et al. | Dec. 23, 1952 |
| 2,644,390 | Delf et al. | July 7, 1953 |
| 2,755,015 | Douglas et al. | July 17, 1956 |
| 2,846,936 | Copeland | Aug. 12, 1958 |
| 2,862,657 | Copeland et al. | Dec. 2, 1958 |